Figure 1:
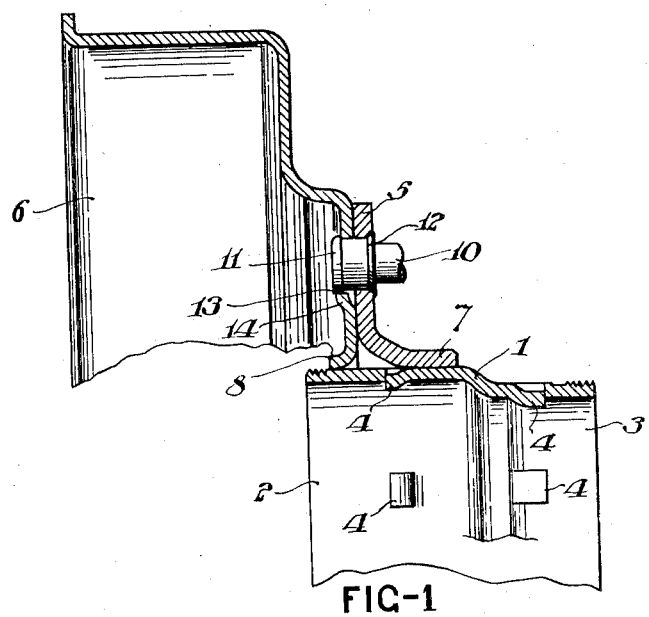

Jan. 17, 1928.

J. H. HUNT 1,656,201

HUB CONSTRUCTION FOR VEHICLE WHEELS

Filed Sept. 30, 1926

INVENTOR:
J. Harold Hunt,
BY
John P. Tarbox
ATTORNEY.

Patented Jan. 17, 1928.

1,656,201

UNITED STATES PATENT OFFICE.

J. HAROLD HUNT, OF DETROIT, MICHIGAN, ASSIGNOR TO BUDD WHEEL COMPANY, OF PHILADELPHIA, PENNSYLVANIA, A CORPORATION OF PENNSYLVANIA.

HUB CONSTRUCTION FOR VEHICLE WHEELS.

Application filed September 30, 1926. Serial No. 138,717.

This invention relates to vehicle wheels and is directed more particularly to a hub construction for wheels such as used on automotive vehicles.

The primary object of the present invention is to provide a hub construction which shall consist of few parts that are simple in construction, inexpensive to manufacture, and which may be easily and quickly assembled to form a strong and durable arrangement.

Another object is to provide a hub construction wherein the brake drum and radial hub flange shall in effect brace each other and also embody a broad bearing surface in contact with the hub, thus affording a particularly strong and durable structure.

A further object is to provide a hub construction of the aforesaid character which shall include a novel and simple arrangement for providing bearing stops within the hub so as to accurately position the hub bearings therein.

These and further objects and advantages will become more apparent as the description proceeds and will be pointed out in the appended claims.

Figure 2:
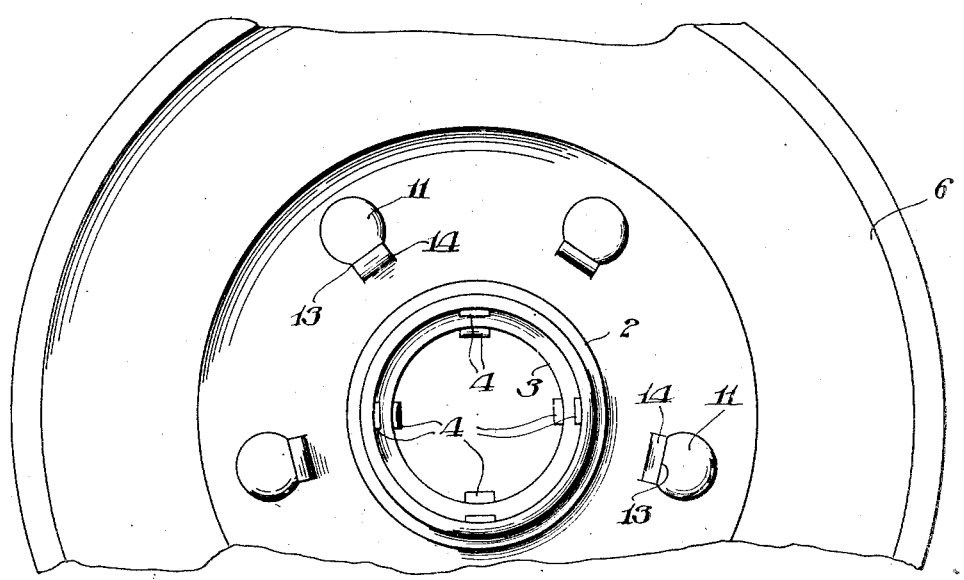

In the drawing accompanying and forming part of this application,

Fig. 1 is a fragmentary sectional view of a hub structure constructed in accordance with my invention; and Fig. 2 is a fragmentary rear elevation thereof.

In practicing my invention, I provide a hub 1 which may be drawn from steel tubing to the desired shape. In the present instance I have shown the hub comprising an enlarged portion 2 and a reduced portion 3. This hub is adapted to receive a bearing element (not shown) in each end, and in order to accurately position these elements, I provide a plurality of inwardly directed projections, each of which may be conveniently formed by piercing the metal of the hub and deflecting a tongue 4 inwardly. These tongues serve as stops to limit the inward movement of the bearing elements and hence accurately position the same within the hub.

Secured to the exterior surface of the hub is a radially projecting flange 5 and a brake drum 6. The flange 5 is formed with a laterally extending portion 7 which snugly engages the exterior surface of the hub and is preferably fastened thereto by welding, although rivets or other fastening means may be employed if desired. The brake drum 6 is formed with the inner edge portion 8 thereof turned laterally to snugly seat on the exterior surface of the hub and is fastened thereto, preferably by welding, although other suitable fastening means may be used if desired. It will be noted that I preferably arrange the laterally extending portions 7 and 8 of the hub flange and brake drum so that they extend in opposite directions and thus afford a wide seat on the hub. The radially extending portions of hub flange and brake drum are disposed in contacting relation and thus brace each other against lateral forces. These portions are further strengthened by a plurality of wheel attaching studs 10 that extend therethrough and which are fastened in position by the head 11 engaging the brake drum and the shank thereof being riveted or swaged over the radial flange 5, as indicated at 12. This arrangement serves to clamp the radially extending portions of the brake drum and flange together and hence affords a stiff structure to clamp the wheel to. In order to prevent the studs 10 from turning when the usual disk retaining nuts are tightened thereon, I flatten one side of each head 11 as indicated at 13 and seat such flattened portion against a tongue 14 struck inwardly from the brake drum.

With the construction above described, it is obvious that the various elements may be easily formed and easily and quickly assembled and when so assembled they provide a hub construction that is capable of withstanding lateral and radial forces to which the wheel is usually subjected.

I claim:

1. A hub construction of the character set forth comprising a hub shell, a radial flange having a laterally projecting portion seated on said hub shell, a brake drum having a laterally extending portion seated on said hub shell said brake drum having a radially extending portion engaged with said radial flange and means for attaching a demountable wheel extending through said brake drum and flange and securing the same together.

2. A hub construction of the character set forth comprising a hub shell a radial flange having a laterally projecting portion seated on said hub shell and welded thereto, a brake drum having a laterally extending portion seated on and welded to said hub shell and extending in a direction opposite to the laterally extending portion of said flange, said brake drum having a radially extending portion engaged with said radial flange, and wheel mounting studs projecting through and clamping said brake drum and flange together.

3. A hub construction comprising a hub having a radially extending flange, a brake drum having a portion seated against said flange and studs for clamping the brake drum to the flange, said studs having non circular heads and the brake drum having shoulders struck from it cooperating with said heads to prevent rotation of the studs.

4. A hub construction of the character set forth comprising a hub member having a substantially unbroken cylindrical surface, and a separately formed radial permanently attached main wheel body supporting flange having a laterally extending annular portion seated on and secured to said hub portion.

In testimony whereof he hereunto affixes his signature.

J. HAROLD HUNT.